(12) United States Patent
Suzuki

(10) Patent No.: US 9,563,390 B2
(45) Date of Patent: Feb. 7, 2017

(54) COMMUNICATION APPARATUS, CONTROL METHOD, AND COMPUTER READABLE MEDIUM

(71) Applicant: CANON KABUSHIKI KAISHA, Tokyo (JP)

(72) Inventor: Takeshi Suzuki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/009,368

(22) Filed: Jan. 28, 2016

(65) Prior Publication Data

US 2016/0224290 A1    Aug. 4, 2016

(30) Foreign Application Priority Data

Jan. 30, 2015    (JP) ................... 2015-017860

(51) Int. Cl.
   *G06F 3/12*    (2006.01)
(52) U.S. Cl.
   CPC ........... *G06F 3/1236* (2013.01); *G06F 3/1203* (2013.01)
(58) Field of Classification Search
   None
   See application file for complete search history.

(56) References Cited

U.S. PATENT DOCUMENTS

| | | | | |
|---|---|---|---|---|
| 7,523,224 B2* | 4/2009 | Fukunaga | ............. | G06F 9/4411 340/12.37 |
| 7,895,367 B2* | 2/2011 | Nakamura | ............ | G06F 3/1203 709/227 |
| 8,072,631 B2* | 12/2011 | Murai | ....................... | G06F 3/14 345/2.3 |
| 8,095,705 B2* | 1/2012 | Ogasawara | ........ | H04N 1/00204 710/38 |
| 8,576,813 B2* | 11/2013 | Moritomo | ......... | H04W 52/0225 370/328 |
| 2013/0217338 A1* | 8/2013 | Chou | ....................... | G06F 3/02 455/41.2 |
| 2016/0004490 A1* | 1/2016 | Nagatani | ................ | H04L 67/36 358/1.15 |

FOREIGN PATENT DOCUMENTS

JP    2002-359623 A    12/2002

* cited by examiner

*Primary Examiner* — Dung Tran
(74) *Attorney, Agent, or Firm* — Canon USA, Inc., IP Division

(57) ABSTRACT

A communication apparatus that communicates with an information processing apparatus includes a switching unit for switching between an invalid state and a valid state of an access point in the communication apparatus and a setting unit for setting, for the communication apparatus based on information acquired from the information processing apparatus to which the communication apparatus is connected via the access point in the valid state, a communication mode in which the communication apparatus can communicate with the information processing apparatus using a first connection method. The switching unit does not bring the access point into the valid state when the communication apparatus is connected to the information processing apparatus using a second connection method and is able to bring the access point into the valid state when the communication apparatus is not connected to the information processing apparatus using the second connection method.

17 Claims, 5 Drawing Sheets

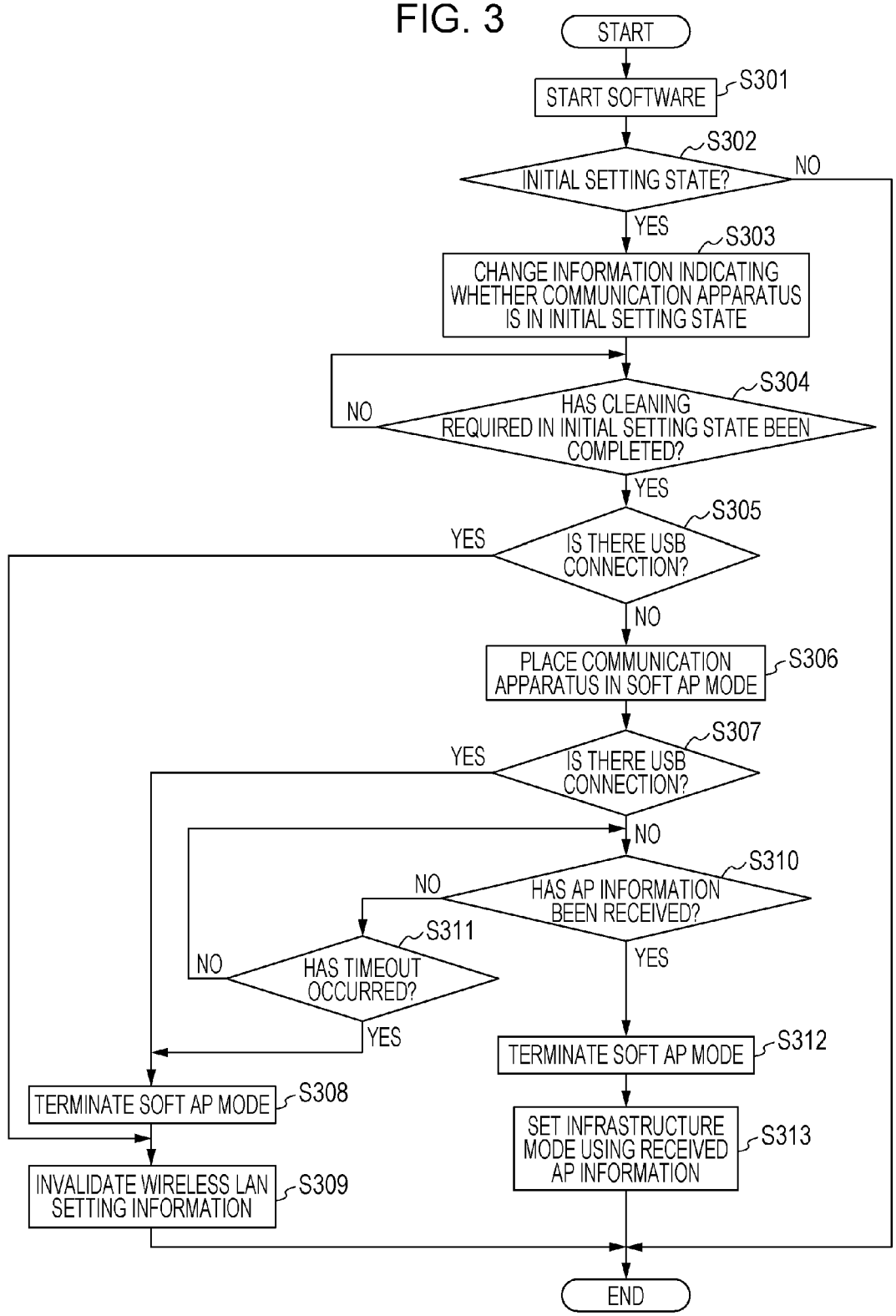

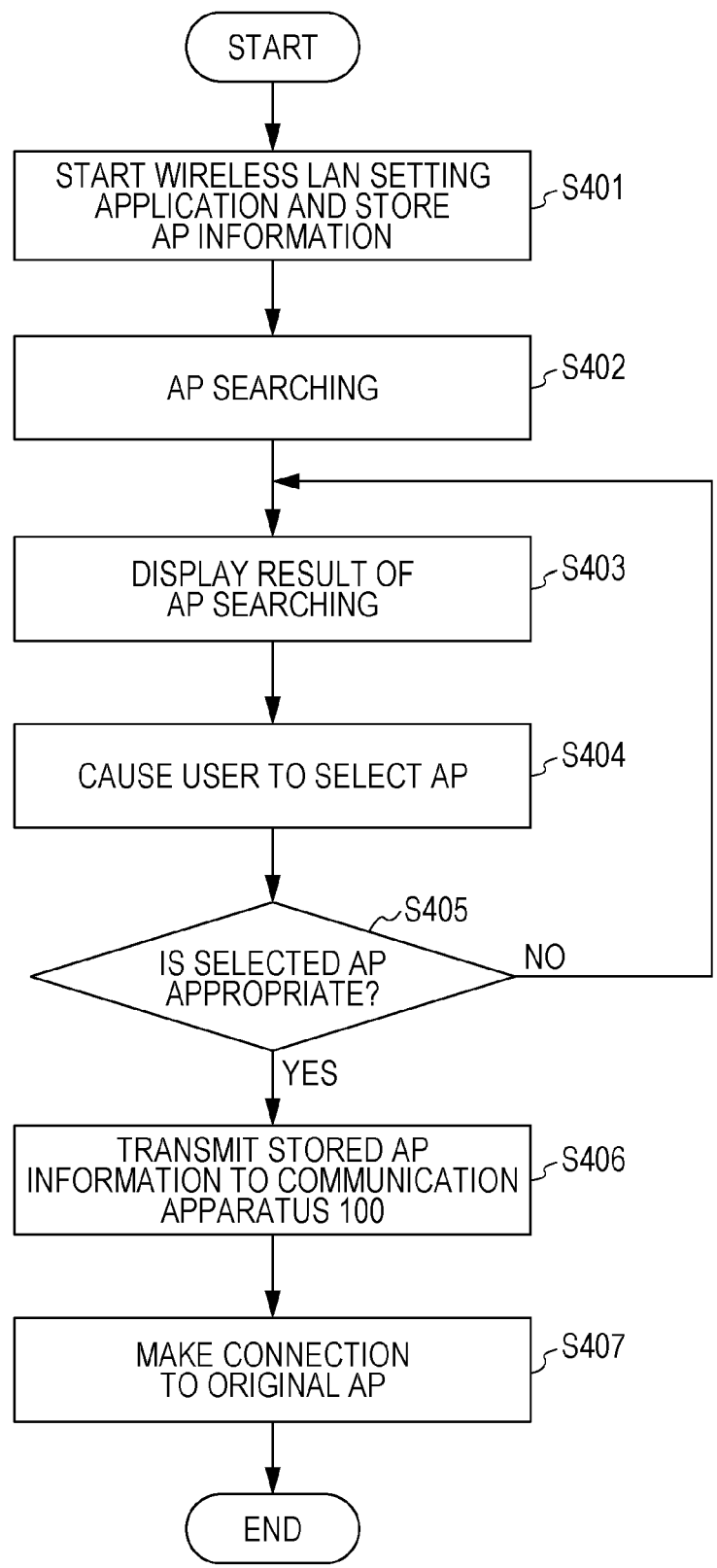

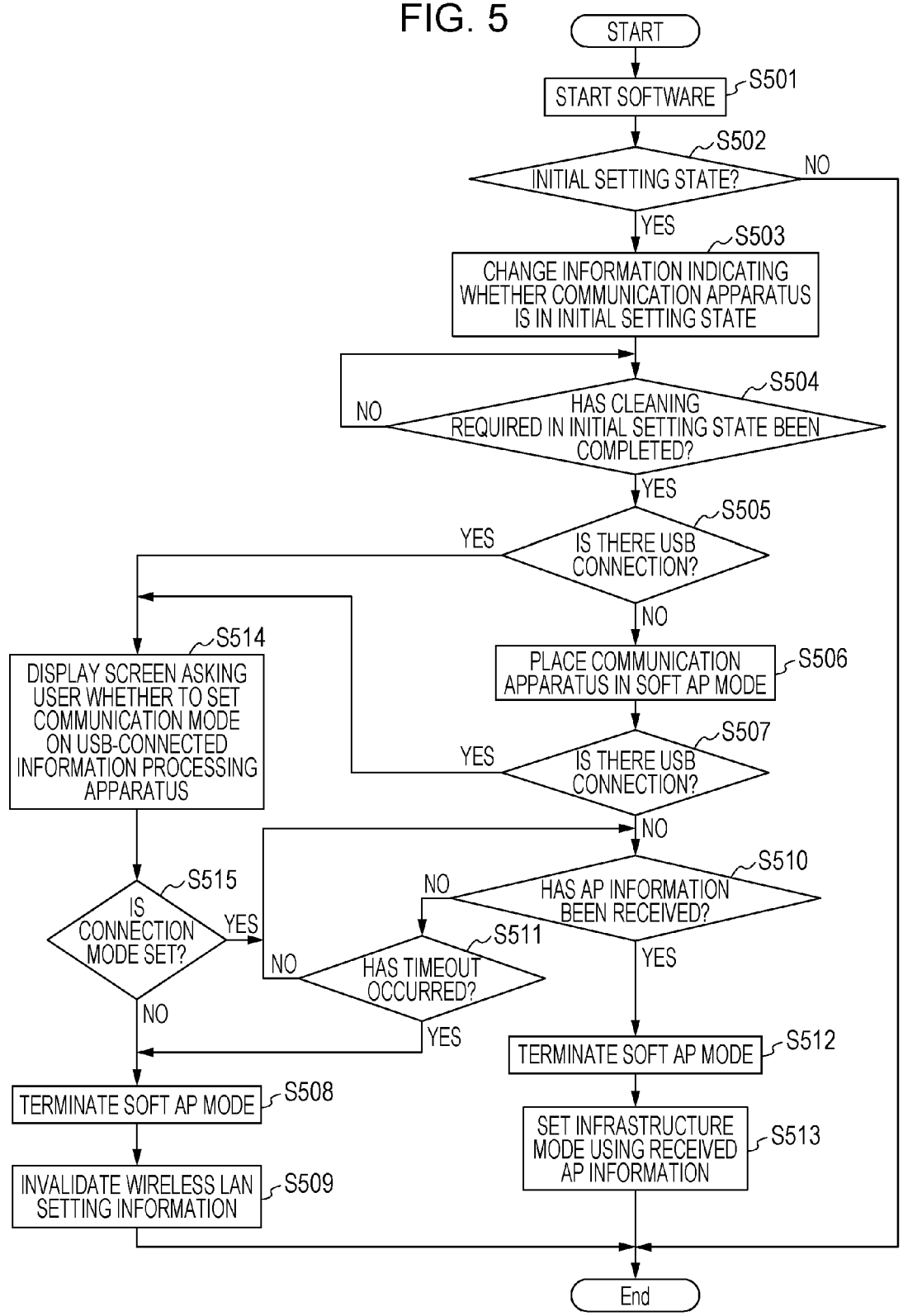

COMMUNICATION APPARATUS, CONTROL METHOD, AND COMPUTER READABLE MEDIUM

BACKGROUND

Field

Aspects of the present invention generally relate to a communication apparatus, a control method, and a computer readable medium.

Description of the Related Art

Communication apparatuses capable of establishing communication using a plurality of connection methods such as Universal Serial Bus (USB) (registered trademark) connection and wireless connection have been known. For such a communication apparatus, a communication mode in which a connection to an information processing apparatus is made using one of these connection methods is set. Japanese Patent Laid-Open No. 2002-359623 discloses a communication apparatus capable of receiving communication information from an information processing apparatus and automatically setting a communication mode on the basis of the communication information.

However, for example, in a case where the connection method of such a communication apparatus is determined in advance, there is no need to set a communication mode. At that time, before setting a communication mode, the communication apparatus is often connected to an information processing apparatus using the connection method determined in advance.

SUMMARY

Aspects of the present invention generally provide a communication apparatus that appropriately performs setting of a communication mode in which a connection to an information, processing apparatus is made using a connection method other than a predetermined connection method, a control method, and a computer readable medium.

A communication apparatus according to an embodiment of an aspect of the present invention that communicates with an information processing apparatus includes a switching unit configured to switch between an invalid state and a valid state of an access point in the communication apparatus and a setting unit configured to set, for the communication apparatus based on information acquired from the information processing apparatus to which the communication apparatus is connected via the access point that has been brought into the valid state by the switching unit, a communication mode in which the communication apparatus operates to communicate with the information processing apparatus using a first connection method. The switching unit does not bring the access point into the valid state in a case where the communication apparatus is connected to the information processing apparatus using a second connection method different from the first connection method, and is able to bring the access point into the valid state in a case where the communication apparatus is not connected to the information processing apparatus using the second connection method.

Further features of the present disclosure will become apparent from the following description of exemplary embodiments with reference to the attached drawings.

BRIEF DESCRIPTION OF THE DRAWINGS

FIG. 3 is a flowchart illustrating a process performed by a communication apparatus according to an embodiment.

FIG. 4 is a flowchart illustrating a process performed by an information processing apparatus connected to a communication apparatus according to an embodiment.

FIG. 5 is a flowchart illustrating a process performed by a communication apparatus according to an embodiment.

DESCRIPTION OF THE EMBODIMENTS

Exemplary embodiments of aspects of the present invention will be described below by way of example with reference to the accompanying drawings. It should be noted that changes and modifications may be made to the following embodiments without departing from the essence of the aspects of the present invention based on the knowledge of those skilled. In the art and these changes and modifications are also intended to be within the scope of the aspects of the present invention.

First Embodiment

Figure 1:
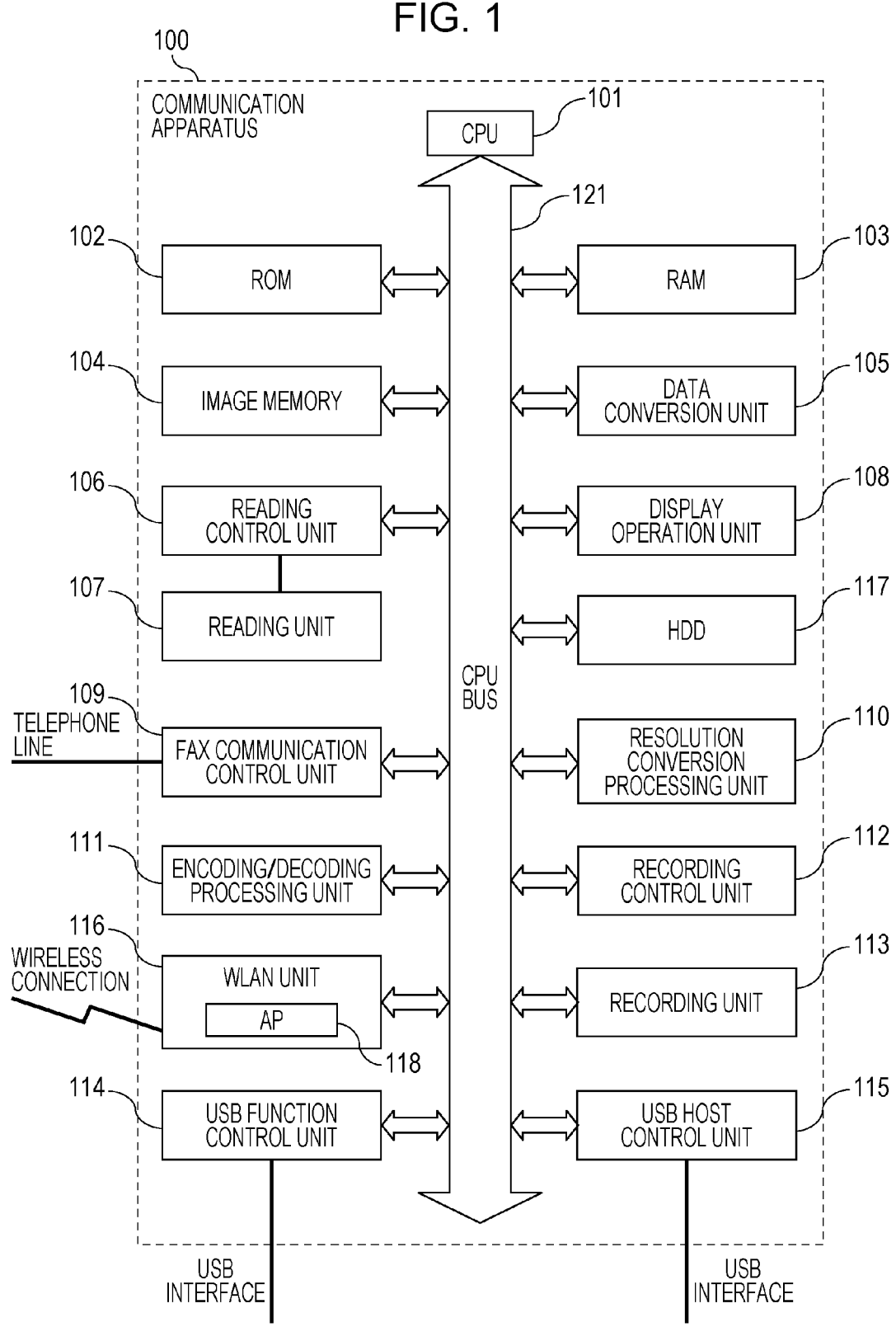
FIG. 1 is a schematic block diagram illustrating the configuration of a communication apparatus according to an embodiment.

A communication apparatus according to a first embodiment will be described with reference to FIG. 1. A communication apparatus is a printer in this embodiment, but may be any apparatus capable of communicating with an information processing apparatus to be described later. Examples of a communication apparatus include various printers such as an ink-jet printer, a full-color laser beam printer, and a black-and-white printer, a copier, a facsimile apparatus, a mobile terminal, a smartphone, a notebook personal computer (PC), a tablet terminal, a Personal Digital Assistant (PDA), a digital camera, and a multifunction device having a copy function, a facsimile function, and a print function. An information processing apparatus is a PC in this embodiment, but may be, for example, a mobile terminal, a smartphone, a tablet terminal, a PDA, or a digital camera.

First, the configurations of a communication apparatus according to an embodiment will be described with reference to the block diagram in FIG. 1. Although the following exemplary configuration of a communication apparatus is employed in this embodiment, a communication apparatus according to this embodiment does not necessarily have to have functions illustrated in the drawing as long as it can communicate with an information processing apparatus.

A CPU 101 is a system control unit, and performs overall control of a communication apparatus 100. A Read-Only Memory (ROM) 102 stores fixed data such as a control program executed by the CPU 101, a data table, and an embedded operating system (OS) program. In an embodiment of an aspect of the present invention, each control program stored in the ROM 102 executes software execution controls such as scheduling, task switching, and interruption processing under management of the embedded OS program stored in the ROM 102. A Random Access Memory (RAN) 103 is formed of, for example, a Static Random Access Memory (SRAM) requiring a backup power supply, and stores data using a primary battery for data backup (not illustrated). The RAM 103 further stores program control variables or the like. In the PAM 103, a memory area is provided to store setting values registered by a user at the time of, for example, wireless LAN setting, management data of the communication apparatus 100, and information indicating whether the communication apparatus 100 is in its initial setting state after power-up (hereinafter referred to as an initial setting state).

An image memory 104 is formed of, for example, a Dynamic Random Access Memory (DRAM) and stores image data. In the image memory 104, a work area is provided for the execution of software processing. A data conversion unit 105 generates image data by, for example, analyzing a page description language (PDL) and expanding character data into Computer Graphics (CG). The data conversion unit 105 may decompress compressed image data received from an information processing apparatus 200. A reading unit 107 optically reads a document using a CIS image sensor. A reading control unit 106 converts an image read by the reading unit 107 into electric image data, causes an image processing control unit (not illustrated) to perform various pieces of image processing such as binarization processing and halftone processing upon the electric image data, and outputs high-resolution image data. The reading control unit 106 and the reading unit 107 may use any one of the following two control methods. A first method is a sheet reading control method of causing a fixed CIS image sensor to perform reading while conveying a document. A second method is a book reading control method of causing a moving CIS image sensor to scan a document fixed on a document plate.

A display operation unit. 108 is formed of keys including numerical value input keys, mode setting keys, an enter key, and a cancel key, a light-emitting diode (LED), and a liquid crystal display (LCD). By operating the communication apparatus 100 with the display operation unit 108, a user can start each function of the communication apparatus 100 or make various settings for the communication apparatus 100. The display operation unit 108 does not necessarily have to include an LCD. A fax communication control unit 109 is connected to a telephone line, and transmits/receives a fax image to/from a fax machine (not illustrated). A resolution conversion processing unit 110 performs resolution conversion controls such as interconversion between millimeter-based image data and inch-based image data and enlargement/reduction processing. An encoding/decoding processing unit 111 performs encoding/decoding processing (for example, non-compression, MH, MR, MMR, JBIG, JPEG) and enlargement/reduction processing upon image data to be handled by the communication apparatus 100. A recording control unit 112 converts image data to be printed into high-resolution image data by causing the image processing control unit (not illustrated) to performing various pieces of image processing such as smoothing, print density correction, and color correction upon the image data, and outputs the high-resolution image data to a recording unit 113. The recording unit 113 is formed of, for example, a laser beam printer or an inkjet printer, and prints an image on a printing material on the basis of color image data or monochrome image data generated by the recording control unit 112.

A USB function control unit 114 controls connection of a USB interface, and performs protocol control in accordance with a USB connection standard. More specifically, the USB function control unit 114 converts data from a USB function control task executed by the CPU 101 into a packet, and transmits the USB packet to the information processing apparatus 200. Furthermore, the USB function control unit 114 converts a USB packet received from an external PC into data, and transmits the data to the CPU 101. Still furthermore, the USB function control unit 114 detects the connection of the communication apparatus 100 to the information processing apparatus 200 via a USB. A USB host control unit 115 is a control unit for making a connection in accordance with a protocol defined by a USB connection standard. The USB connection standard is a standard with which high-speed bi-directional data connection can be achieved. Using this standard, a plurality of hubs or functions (slaves) can be connected to a single host (master). The USB host control unit 115 has the function of a host in USB connection.

A WLAN unit 116 is wirelessly connected to a terminal on a network (network that is connectable in accordance with TCP/IP). The WLAN unit 116 is used for the wireless LAN (hereinafter referred to as WLAN) connection to an access point (hereinafter referred to as AP) 118 and the information processing apparatus 200, and can make a data (packet) connection in a WLAN system compliant with, for example, IEEE802.11 series.

By setting a communication mode, the communication apparatus 100 operates to be capable of performing communication via the WLAN unit 116 using a connection method corresponding to the communication mode. For the communication apparatus 100, a communication mode such as a soft AP mode, a Wi-Fi Direct (registered trademark) (hereinafter referred to as WFD) mode, a WFD extend mode, an infrastructure mode, or an ad hoc mode is set. The soft AP mode is used when a communication mode is set for the communication apparatus 100, and is a mode in which the AP 118 is validated by software setting and the communication apparatus 100 operates. When the communication apparatus 100 operates in the soft AP mode, the communication apparatus 100 periodically transmits a beacon signal (packet) including its own SSID. An information processing apparatus capable of communicating with the communication apparatus 100 can therefore detect the AP 118 by performing AP searching. The SSID of the AP 118 has a format based on a rule determined in advance. An information processing apparatus that understands this rule can identify the communication apparatus 100, and performs peer-to-peer communication with the communication apparatus 100 via the AP 118 after identifying the AP 118. The rule includes, for example, information identifying the model of the communication apparatus 100 or a series including this model, the MAC address of the communication apparatus 100, and a manufacturer name. This SSID is stored in, for example, the ROM 102 in advance. When the communication apparatus 100 is placed in the soft AP mode, the communication apparatus 100 can set a communication mode on the basis of a network status around the communication apparatus 100. For example, when the communication apparatus 100 receives network information (for example, AP information to be described later) around the communication apparatus 100 from an information processing apparatus, the setting of a communication mode is performed. Since this processing can be performed without using a cable, the communication mode at that time is sometimes called a "cableless setup mode". The WFD mode is a mode in which WFD-based wireless connection is performed. When the communication apparatus 100 operates in the WFD mode, the communication apparatus 100 performs P2P direct wireless connection to an information processing apparatus connected thereto (hereinafter referred to as a connection destination apparatus). At that time, which of APs in these apparatuses is used for the connection between these apparatuses is determined by Group Owner Negotiation. The WFD extend mode is a mode in which WFD-based extended service is performed. When the communication apparatus 100 operates in the WFD extend mode, the communication apparatus 100 performs WFD Group Owner Negotiation with a connection destination apparatus and then performs a negotiation on service available for both of these apparatuses to perform the service. The infrastructure mode is a mode in which the communication apparatus 100 performs wireless connection via an AP in an apparatus other than the communication apparatus 100. In order to operate in the infrastructure mode, it is necessary for the communication apparatus 100 to receive the SSID of an AP used in the infrastructure mode and a parameter required for the use of the AP (hereinafter referred to as AP information) from a connection destination apparatus and register them. The ad hoc mode is a mode in which the communication apparatus 100 and a connection destination apparatus perform P2P direct wireless connection with each other. Unlike in the WFD mode and the WFD extend mode, in the ad hoc mode, a connection between apparatuses is made without using APs in these apparatuses. In order to operate in the ad hoc mode, it is necessary for the communication apparatus 100 to register a common wireless connection parameter with a connection destination apparatus. These modes do not necessarily have to be exclusively set, and a plurality of modes may be set at the same time.

The above-described components are interconnected via a CPU bus 121 managed by the CPU 101.

Figure 2:
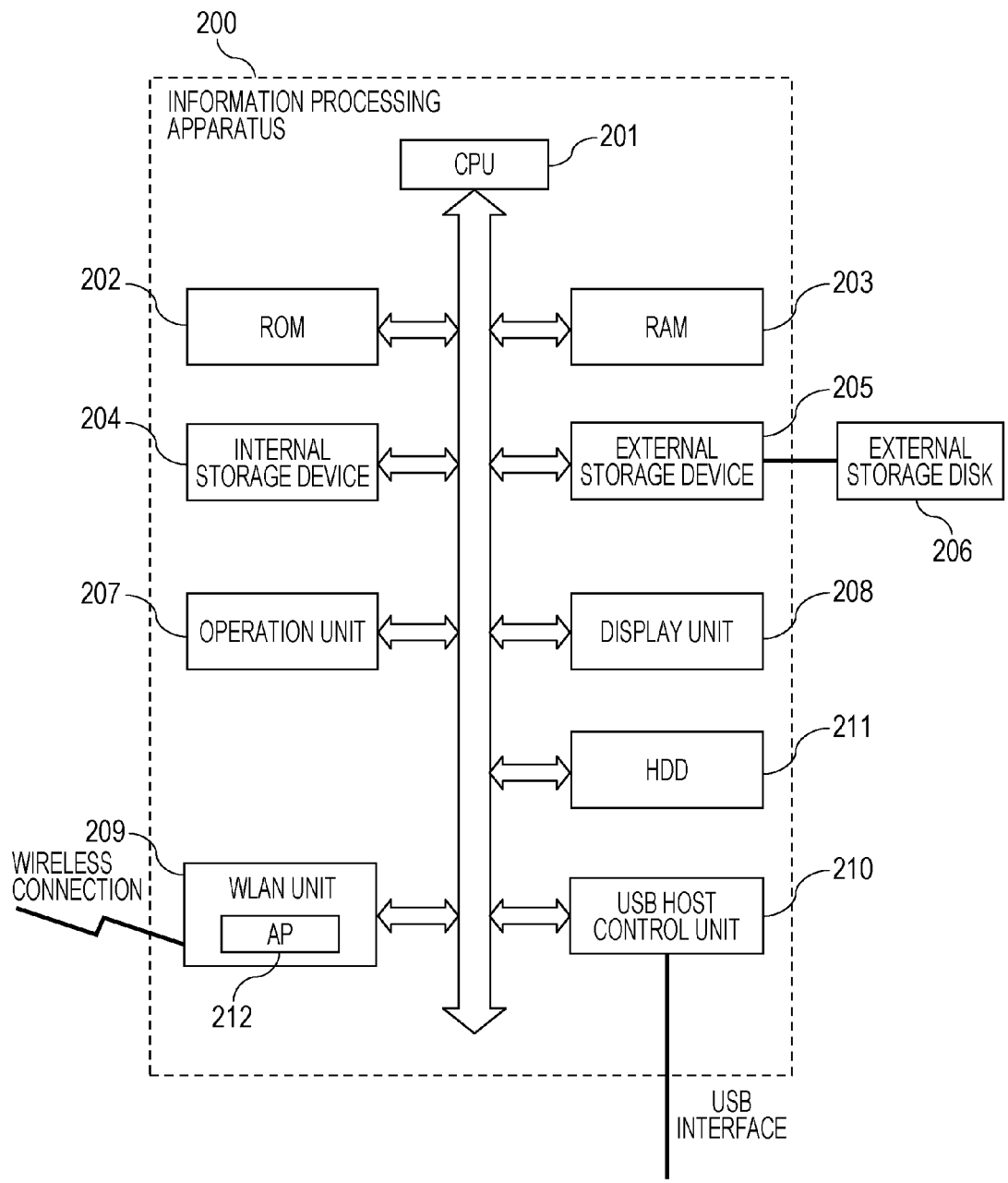
FIG. 2 is a schematic block diagram illustrating the configuration of an information processing apparatus connected to a communication apparatus according to an embodiment.

The configuration of an information processing apparatus connected to a communication apparatus according to an embodiment of an aspect of the present invention will be described with reference to a block diagram in FIG. 2. Although the following exemplary configuration of the information processing apparatus 200 is employed in this embodiment, the information processing apparatus 200 does not necessarily have to have functions illustrated in the drawing as long as it can communicate with the communication apparatus 100.

A CPU 201 performs the overall control of the information processing apparatus 200 via a system bus in accordance with a program that is read from, for example, an external storage disk 206 by a Read-Only Memory (ROM) 202, a Random Access Memory (RAM) 203, an internal storage device 204, or an external storage device 205. The ROM 202 stores, for example, a control program for the CPU 201. The RAM 203 temporarily stores a program and image data for a high-speed operation. The internal storage device 204 stores an operating system, various application programs including a wireless LAN setting application, and image data. These pieces of application software are usually received from another computer-readable medium storing them by the external storage disk 206 (for example, a CD/DVD medium), and are installed into the information processing apparatus 200 by controlling the external storage device 205. An operation unit 207 controls a keyboard (not illustrated) and a mouse (not illustrated) which are instruction input units for receiving a user's instruction. A display unit 208 displays various pieces of information for a user. An AP 212 is used for wireless connection to the communication apparatus 100 or another information processing apparatus. A WLAN unit 209 has the same function as the WLAN unit 116, and the detailed description thereof will be therefore omitted. A USB host control unit 210 functions as a host in USB connection, and is used for connection to the communication apparatus 100. The USB host control unit 210 has the same function as the USB host control unit 115, and the detailed description thereof will be therefore omitted.

FIG. 3 is a flowchart illustrating a process performed by the communication, apparatus 100 according to this embodiment at the time of initial setting. This process is realized by causing the CPU 101 to load a control program regarding this process stored in the ROM 102 or an HDD 117 into the RAM 103 and execute the control program.

In step S301, when the CPU 101 detects that a power button on the display operation unit 108 has been pressed by a user, the CPU 101 sets a software on state. The setting of a software on state is to start software upon the press of the power button on the display operation unit 108 in the communication apparatus 100 in which a hardware power supply is in an ON state and the software does not operate.

In step S302, the CPU 101 refers to information indicating whether the communication apparatus 100 is in an initial setting state stored in the RAM 103 and determines whether the communication apparatus 100 is in the initial setting state. More specifically, when a user activates the communication apparatus 100 for the first time, an initial setting flag indicates ON in the RAM 103. On the other hand, when the communication apparatus 100 is activated for the second and subsequent times, the initial setting flag indicates OFF in the RAM 103. The processing of step S302 is performed by causing the CPU 101 to determine which of ON and OFF the initial setting flag indicates. When the communication apparatus 100 is not in the initial setting state, the process ends. Except in a case where the connection environment of the communication apparatus 100 changes, there is no need to reset a communication mode except when the communication apparatus 100 is in the initial setting state. Accordingly, the above-described processing can eliminate the need to set a communication mode each time the communication apparatus 100 is powered on. At that time, a UI asking a user whether to perform communication mode setting processing may be displayed, and the communication mode setting processing may be performed on the basis of a response from the user. On the other hand, when the communication apparatus 100 in the initial setting state, the CPU 101 starts processing such as cleaning required at the time of initial setting. Subsequently, in step S303, the CPU 101 changes the information indicating whether the communication apparatus 100 is in the initial setting state so as to notify a user that the communication apparatus 100 is not in the initial setting state at the next and subsequent startup times. More specifically, the CPU 101 changes the state of the initial setting flag. Although the processing of step S302 is performed using the ON or OFF state of the initial setting flag in this embodiment, another piece of information may be used. For example, information indicating that the communication apparatus 100 is in the initial setting state may be stored in the RAM 103. In step S302, it may be determined whether the information indicating that the communication apparatus 100 is in the initial setting state is stored in the RAM 103. In step S305, the information indicating that the communication apparatus 100 is in the initial setting state may be deleted. The processing of step S303 may be performed at any time after the determination of whether the communication apparatus 100 is in the initial setting state. For example, the processing may be performed after a communication mode has been set for the communication apparatus 100 in step S313 or after wireless LAN setting information of the communication apparatus 100 has been invalidated in step S309.

In step S304, it is determined whether the processing required at the time of initial setting has been completed. When the processing has not been completed, the CPU 101 repeats step S304 until the processing is completed. When the processing has been completed, the process proceeds to step S305.

In step S305, the CPU 101 determines whether the communication apparatus 100 has a connection via a USB cable (hereinafter referred to as a USB connection). When the communication apparatus 100 has a USB connection, the CPU 101 invalidates the wireless LAN setting stored in the RAM 103 in step S309 and the process ends. The reason for this is that there is no need to set a communication mode in which a wireless connection is made since the connection between the communication apparatus 100 and the information processing apparatus 200 is made with a USB cable. With this configuration, it is possible to establish a connection by USB connection without waiting for the setting of a communication mode. On the other hand, when the communication apparatus 100 does not have a USB connection, the CPU 101 places the communication apparatus 100 in the soft AP mode in step S306. Since the communication apparatus 100 is brought into a state where it periodically transmits beacons including its SSID, the communication apparatus 100 can provide information included in the beacons at the time of AP searching performed by a connection destination apparatus (for example, the information processing apparatus 200). When a connection request is transmitted from the information processing apparatus 200 in this state, the exchange of a connection Parameter is performed between the communication apparatus 100 and the information processing apparatus 200 and they are connected to each other via the AP 118. At that time, the CPU 101 may blink a light-emitting diode (LED) on the display operation unit 108 or may display specific information on an LCD to inform a user that the communication apparatus 100 has been placed in the soft AP mode.

Subsequently, in step S307, the CPU 101 determines whether the communication apparatus 100 has a USB connection again. When the communication apparatus 100 has a USB connection, the CPU 101 terminates the soft AP mode in step S308 to stop the transmission of a beacon and invalidate the AP 118. In step S309, the CPU 101 invalidates the wireless LAN setting information stored in the RAM 103. Subsequently, the process ends. Thus, it is determined whether there is a USB connection even after the soft AP mode has been set. It is therefore possible to establish a connection by USB connection without waiting for the setting of a communication mode even when the communication apparatus 100 has a USB connection after being placed in the soft AP mode.

On the other hand, when there is no USB connection, the processing of step S310 is performed. At that time, the communication apparatus 100 is in the soft AP mode. As described previously, in the soft AP mode, AP information is received from a connection destination apparatus and a communication mode is set. Therefore, in step S310, the CPU 101 determines whether AP information has been received from the information processing apparatus 200. When it is determined that AP information has not been received, the CPU 101 determines whether a timeout has occurred in step S311. A timeout means that the communication apparatus 100 is not connected to a connection destination apparatus or does not receive AP information within a predetermined period from the placement of the communication apparatus 100 in the soft AP mode in step S306. When it is determined that a timeout has not occurred, the CPU 101 performs the processing of step S310 again. When it is determined that a timeout has occurred, the CPU 101 terminates the soft AP mode in step S308, and invalidates the wireless LAN setting information stored in the RAM 103 in step S309. Subsequently, the process ends. The reason for this is that, when a timeout occurs, it is determined that there is no information processing apparatus or AP capable of being wirelessly connected to the communication apparatus 100 around the communication apparatus 100 and the infrastructure mode cannot be set. At that time, the CPU 101 may cause the display operation unit 108 to display, for a user, the fact that a timeout has occurred or a recommendation to make a USB connection.

On the other hand, when AP information is received in step S310, the CPU 101 terminates the soft AP mode in step S312 and sets an AP to be used in the infrastructure mode in step S313. More specifically, the CPU 101 registers an AP corresponding to the received AP information in the RAM 103 as an AP to be used in the infrastructure mode. In a case where an encryption key is needed to use the AP, the CPU 101 registers the encryption key. After the registration of the AP has been appropriately completed, the CPU 101 places the communication apparatus 100 in the infrastructure mode in which a connection can be made via the registered AP. As a result, the communication apparatus 100 operates to be capable of making a wireless connection via the registered AP.

FIG. 4 is a flowchart illustrating a process in which the information processing apparatus 200 sets a communication mode for a communication apparatus according to this embodiment. This process is realized by causing the CPU 201 to load a control program regarding this process stored in the ROM 202 or an HDD 211 into the RAM 203 and execute the control program.

In step S401, the CPU 201 receives a user's operation and starts a wireless LAN setting application. The wireless LAN setting application is used to set a communication mode for the communication apparatus 100. In this embodiment, the communication apparatus 100 is placed in the infrastructure mode by registering, in the communication apparatus 100, an AP to be used in the infrastructure mode. The wireless LAN setting application is a program stored in the internal storage device 204, and is installed in the information processing apparatus 200 in advance by a user. For the registration of an AP, the wireless LAN setting application, does not necessarily have to be used. Service on the Internet may be used via a Web browser or other functions of the information processing apparatus 200 and the communication apparatus 100 may be used. At that time, the CPU 201 temporarily stores information about an AP connected to the information processing apparatus 200 in the RAM 203.

In step S402, the CPU 201 searches for an AP accessible to the information processing apparatus 200 via the WLAN unit 209. This AP searching may be automatically performed at the time of the startup of the wireless LAN setting application, or may be performed in response to a user's instruction. When the WLAN unit 209 receives a beacon from each AP, the AP searching is performed. In step S403, the CPU 201 displays a list of APs, which is a result of the AP searching, on the display unit 208. At that time, the CPU 201 displays, for example, the list of SSIDs of the APs in step S403, the CPU 201 may automatically extract an AP having an SSID compliant with the above-described rule and display them. At that time, when a plurality of SSIDs compliant with the above-described rule are extracted, the CPU 201 displays these SSIDs to allow a user to select one of them. In this case, the processing of step S405 to be described later does not necessarily have to be performed.

When APs are displayed in step S403, a user selects, from the searching result, an AP in a communication apparatus for which a communication mode is to be set. In step S404, the CPU 201 detects the selection of an AP performed by the user. After detecting the selection of an AP, the CPU 201 determines whether the selected AP is an AP in a setting target communication apparatus in step S405. More specifically, at that time, the CPU 201 determines whether the selected AP has an SSID compliant with the above-described rule. When determining that the selected AP is not an AP in a setting target communication apparatus, the CPU 201 waits for the user's selection of an AP again. At that time, the CPU 201 may display a screen on the play unit 208 to inform the user that an inappropriate AP has been selected. When there is no corresponding AP in a setting target communication apparatus or there is no AP in a user's desired communication apparatus, the CPU 201 may end the process. When an AP (the AP 118 in this case) in a setting target communication apparatus is selected in step S405, the CPU 201 exchanges a parameter used for the wireless connection between the information processing apparatus 200 and the communication apparatus 100. As a result, the information processing apparatus 200 is connected to the AP 118 and establishes communication with the communication apparatus 100.

Subsequently, in step S406, the CPU 201 transmits the AP information temporarily stored in the RAM 203 in step S401 to the communication apparatus 100 via the AP 118 to which the information processing apparatus 200 has been connected in step S405. Upon receiving the AP information, the communication apparatus 100 is set to the infrastructure mode in which a connection can be made via the AP based on the AP information. In step S407, the CPU 201 terminates the connection to the AP 118 and is reconnected to the AP based on the AP information temporarily stored in the RAM 203 in step S401. As a result, communication with the communication apparatus 100 can be established via the AP. At that time, the CPU 201 registers the communication apparatus 100 in the PAM 203 as a connection target communication apparatus of the information processing apparatus 200. Subsequently, the CPU 201 terminates the wireless LAN setting application.

The process from step S402 to step S404 does not necessarily have to be performed by the wireless LAN setting application. For example, the AP 118 may be searched for by another application installed in the information processing apparatus 200, and a result of the searching may be acquired by the wireless LAN setting application.

Communication apparatuses that are placed in a mode in which a wireless communication mode is automatically set without receiving a user's operation (hereinafter referred to as a wireless connection setting mode, and the wireless connection setting mode is equivalent to the soft AP mode in this embodiment) at a predetermined time such as an arrival time have been known. In such a communication apparatus, a user cannot use a USB connection until the completion of processing in the wireless connection setting mode. It is desired for a user who wants to use a USB connection rather than a wireless connection that a communication apparatus not be placed in the wireless connection setting mode. In a case where a communication apparatus does not include a display unit, it is difficult for a user to know an operation for terminating the wireless connection setting mode.

According to this embodiment, in a case where a user wants to establish the USB connection between the communication apparatus 100 and the information processing apparatus 200 rather than the wireless connection between them, it is possible to prevent the communication apparatus 100 from being placed in the wireless connection setting mode only by connecting a USB to the communication apparatus 100. Furthermore, according to this embodiment, in a case where the communication apparatus 100 is in the wireless connection setting mode, it is possible to terminate the wireless connection setting mode only by connecting a USB to the communication apparatus 100. That is, in a case where communication is performed by USB connection, the communication apparatus 100 can perform communication by USB connection without waiting for the completion of processing in the wireless connection setting mode.

Second Embodiment

An exemplary case where the soft AP mode is terminated when there is a USB connection has been described in the first embodiment. In the second embodiment, an exemplary case where a user is asked whether to set a communication mode for a communication apparatus when there is a USB connection and the determination of whether to terminate the soft AP mode is made in accordance with a response from the user will be described.

FIG. 5 is a flowchart illustrating a process performed by the communication apparatus 100 according to this embodiment at the time of initial setting. This process is realized by causing the CPU 101 to load a control program regarding this process stored in the ROM 102 or the HOD 117 into the RAM 103 and execute the control program. The process from step S501 to step S513 is the same as the process from step S301 to step S313, and the description thereof will be therefore omitted.

When it is determined that there is a USB connection in step S505 or S507, the CPU 101 performs the processing of step S514. In step S514, the CPU 101 causes the information processing apparatus 200 connected to the communication apparatus 100 via a USB to display a screen asking a user whether to set a communication mode for the communication apparatus 100. Subsequently, the CPU 101 receives a user's response from the information processing apparatus 200, and determines whether to perform the setting of a communication mode on the basis of the user's response in step S515. When the setting of a communication mode is not performed, the CPU 101 performs the processing of step S508 and terminates the soft AP mode. When the setting of a communication mode is performed, the CPU 101 performs the processing of step S510 and performs the setting of a communication mode.

For example, even in a case where the communication apparatus 100 has a USB connection, a user may want to set a communication mode for the communication apparatus 100, for example, when a USB connection is used for a PC and a wireless connection is used for a smartphone. According to this embodiment, the determination of whether to perform the setting of a communication mode can be made on the basis of not only the presence of a USB connection but also a user's selection.

Other Embodiments

In the above-described embodiments, an exemplary case where the soft AP mode is terminated when there is a USB connection has been described. However, the determination of whether to terminate the soft AP mode does not necessarily have to be made on the basis of the presence of a USB connection, and may be made on the basis of the presence of a wired connection such as an IEEE1284 connection or a wired LAN connection or a wireless connection such as a Bluetooth (registered trademark) connection.

In the above-described embodiments, processes performed in the communication apparatus 100 and the information processing apparatus 200 at the time of initial setting have been performed. However, for example, these processes may be performed while the wireless LAN setting of the communication apparatus 100 is invalid or when the initialization of the communication apparatus 100 is performed.

In the above-described embodiments, an exemplary case where the communication apparatus 100 is placed in the soft AP mode to undergo searching performed by the information processing apparatus 200 has been described. However, the communication apparatus 100 may be placed in any mode in which it can undergo searching performed by the information processing apparatus 200.

In the above-described embodiments, an exemplary case where a communication mode set for the communication apparatus 100 is the infrastructure mode has been described. However, the communication mode may be, for example, a direct communication mode, a WFD mode, a WFD extend mode, or an ad hoc mode. In the above-described embodiments, in the soft AP mode, only a single communication mode is set for the communication apparatus 100. However, one of a plurality of communication modes may be selected according to circumstances and the selected communication mode may be set for the communication apparatus 100. For example, when the AP information is not received in step S310, the CPU 101 may set, for the communication apparatus 100, the direct communication mode or the ad hoc mode in which no AP information is required and communication with an information processing apparatus can be established.

In the above-described embodiments, the communication mode is a mode in which the communication apparatus 100 operates to be capable of establishing communication by wireless connection, but may be a mode in which the communication apparatus 100 operates to be capable of establishing communication by, for example, wired connection or USB connection. In this case, a wired communication mode or a USB communication mode is set for the communication apparatus 100. For example, the CPU 101 may set the wired communication mode for the communication apparatus 100 in the process from step S307 to step S313. Furthermore, in step S309, the CPU 101 may invalidate wireless LAN setting and set the USB communication mode for the communication apparatus 100.

In the aspects of the present invention, as long as the effect of each embodiment can be achieved, the order of pieces of processing in the flowchart in each embodiment may be changed, all pieces of processing do not necessarily have to be performed, or details of pieces of processing may be chanced.

According to an embodiment of an aspect of the present invention, it is possible to appropriately perform processing for setting a communication mode in which a connection to an information processing apparatus is established using a connection method other than a predetermined connection method.

Embodiment(s) of the aspects of the present invention can also be realized, by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-017860, filed Jan. 30, 2015, which is hereby incorporated by reference herein in its entirety.

What is claimed is:

1. A communication apparatus that communicates with an information processing apparatus comprising: at least one processor, wherein at least one of the at least one processor is configured to control
   a switching unit configured to switch between an invalid state and a valid state of an access point in the communication apparatus; and
   a setting unit configured to set, for the communication apparatus based on information acquired from the information processing apparatus to which the communication apparatus is connected via the access point that has been brought into the valid state by the switching unit, a communication mode in which the communication apparatus operates to communicate with the information processing apparatus using a first connection method,
   wherein the switching unit does not bring the access point into the valid state in a case where the communication apparatus is connected to the information processing apparatus using a second connection method different from the first connection method, and is able to bring the access point into the valid state in a case where the communication apparatus is not connected to the information processing apparatus using the second connection method.

2. The communication apparatus according to claim 1, wherein, in a case where the communication apparatus is connected to the information processing apparatus using the second connection method in a state in which the access point is in the valid state, the switching unit brings the access point into the invalid state.

3. The communication apparatus according to claim 1, wherein at least one of the at least one processor further controls a display control unit configured to cause a display unit to display a screen enabling the access point to be brought into the valid state in a case where the communication apparatus is connected to the information processing apparatus using the second connection method, wherein the switching unit determines whether to bring the access point into the valid state based on information input via the screen played by the display control unit.

4. The communication apparatus according to claim 1, wherein the first connection method is a wireless connection to the information processing apparatus and the second connection method is a wired connection to the information processing apparatus.

5. The communication apparatus according to claim 1, wherein the information acquired from the information processing apparatus to which the communication apparatus connected via the access point that has been brought into the valid state by the switching unit includes information about an SSID of an access point external to the communication apparatus and the information processing apparatus, and wherein the first connection method is a connection to the information processing apparatus via an access point external to the communication apparatus and the information processing apparatus.

6. The communication apparatus according to claim 1, wherein the second connection method is wired connection to the information processing apparatus.

7. The communication apparatus according to claim 1, wherein at least one of the at least one processor further controls a determination unit configured to determine whether the setting unit has performed setting of the communication mode, wherein the switching unit brings the access point into the invalid state in a case where it is determined that the setting unit has not performed setting of the communication mode and the communication apparatus is connected to the information processing apparatus using the second connection method and brings the access point into the valid state in a case where it is determined that the setting unit has not performed setting of the communication mode and the communication apparatus is not connected to the information processing apparatus using the second connection method.

8. The communication apparatus according to claim 1, further comprising a print unit configured to print an image based on data received from the information processing apparatus.

9. A control method of a communication apparatus that communicates with an information processing apparatus, comprising:

switching between an invalid state and a valid state of an access point in the communication apparatus; and setting, for the communication apparatus based on information acquired from the information processing apparatus to which the communication apparatus is connected via the access point that has been brought into the valid state, a communication mode in which the communication apparatus operates to communicate with the information processing apparatus using a first connection method, wherein the access point is not brought into the valid state in a case where the communication apparatus is connected to the information processing apparatus using a second connection method different from the first connection method, and the access point is brought into the valid state in a case where the communication apparatus is not connected to the information processing apparatus using the second connection method.

10. The control method according to claim 9, wherein, in a case where the communication apparatus is connected to the information processing apparatus using the second connection method in a state in which the access point is in the valid state, the access point is brought into the invalid state.

11. The control method according to claim 9, further comprising causing a display unit to display a screen enabling the access point to be brought into the valid state in a case where the communication apparatus is connected to the information processing apparatus using the second connection method, wherein the access point is brought into the valid state based on information input via the displayed screen.

12. The control method according to claim 9, wherein the first connection method is wireless connection to the information processing apparatus and the second connection method is a wired connection to the information processing apparatus.

13. The control method according to claim 9, wherein the information acquired from the information processing apparatus to which the communication apparatus is connected via the access point that has been brought into the valid state includes information about an SSID of an access point external to the communication apparatus and the information processing apparatus, and wherein the first connection method is a connection to the information processing apparatus via an access point external to the communication apparatus and the information processing apparatus.

14. The control method according to claim 9, wherein the second connection method is a wired connection to the information processing apparatus.

15. The control method according to claim 9, further comprising determining whether setting of the communication mode has been performed, wherein the access point is brought into the invalid state in a case where it is determined that setting of the communication mode has not been performed and the communication apparatus is connected to the information processing apparatus using the second connection method and is brought into the valid state in a case where it is determined that setting of the communication mode has not been performed and the communication apparatus is not connected to the information processing apparatus using the second connection method.

16. The control method according to claim 9, further comprising printing an image based on data received from the information processing apparatus.

17. A non-transitory computer readable medium storing computer executable instructions configured to execute a control method of a communication apparatus communicating with an information processing apparatus, the control method comprising: switching between an invalid state and a valid state of an access point in the communication apparatus; and setting, for the communication apparatus based on information acquired from the information processing apparatus to which the communication apparatus is connected via the access point that has been brought into the valid state, a communication mode in which the communication apparatus operates to communicate with the information processing apparatus using a first connection method, wherein the access point is not brought into the valid state in a case where the communication apparatus is connected to the information processing apparatus using a second connection method different from the first connection method, and the access point is brought into the valid state in a case where the communication apparatus is not connected to the information processing apparatus using the second connection method.

* * * * *